United States Patent
Bennett et al.

(10) Patent No.: US 11,042,285 B2
(45) Date of Patent: Jun. 22, 2021

(54) SYSTEM AND METHOD FOR CONTROLLING A HUMAN MACHINE INTERFACE (HMI) DEVICE

(71) Applicant: TK Holdings Inc., Auburn Hills, MI (US)

(72) Inventors: Jeffrey Scott Bennett, Brownstown, MI (US); Phillip B. Maguire, Royal Oak, MI (US); Leonard Steven Cech, Brighton, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 1537 days.

(21) Appl. No.: 14/636,811

(22) Filed: Mar. 3, 2015

(65) Prior Publication Data

US 2015/0253753 A1 Sep. 10, 2015

Related U.S. Application Data

(60) Provisional application No. 61/947,741, filed on Mar. 4, 2014.

(51) Int. Cl.
*H04W 4/00* (2018.01)
*G06F 3/0488* (2013.01)
(Continued)

(52) U.S. Cl.
CPC ............ *G06F 3/0488* (2013.01); *B60K 35/00* (2013.01); *B60K 37/06* (2013.01);
(Continued)

(58) Field of Classification Search
CPC .......... G08G 1/09; G08B 21/00; G08B 13/26; G01C 21/00; G01C 21/26; G01C 21/36;
(Continued)

(56) References Cited

U.S. PATENT DOCUMENTS 5,772,686 A 6/1998 Caruana
5,802,479 A 9/1998 Kithil et al.
(Continued)

FOREIGN PATENT DOCUMENTS

EP 0 751 403 A1 1/1997
EP 2 533 575 A1 12/2012
(Continued)

OTHER PUBLICATIONS

International Search Report dated Jun. 29, 2015 issued in PCT/US2015/018436.
(Continued)

*Primary Examiner* — Chanh D Nguyen
*Assistant Examiner* — Nguyen H Truong
(74) *Attorney, Agent, or Firm* — Gordon Rees Scully; Mansukhani, LLP

(57) ABSTRACT

A system for controlling the operation of a human machine interface (HMI) device located in a vehicle configured to carry a passenger and a driver. The system includes an electrode positioned in a vehicle seat and a signal generating device configured to provide a signal to the electrode. The electrode transmit the signal through the occupant of the seat and the HMI device detects the signal when the occupant contacts the HMI device. The system is configured so that the HMI device operates in a first mode in response to exposure to the signal and in a second mode if the signal is not detected.

4 Claims, 3 Drawing Sheets

(51) Int. Cl.
  *B60K 35/00* (2006.01)
  *B60K 37/06* (2006.01)
  *H04M 1/72454* (2021.01)
  *H04M 1/72463* (2021.01)

(52) U.S. Cl.
  CPC ... *H04M 1/72454* (2021.01); *H04M 1/72463* (2021.01); *B60K 2370/48* (2019.05); *B60K 2370/55* (2019.05); *B60K 2370/741* (2019.05)

(58) Field of Classification Search
  CPC .......... G08C 19/00; H04K 3/00; G05B 15/02; H04W 4/00; H04W 4/12; H04W 4/04; H04W 4/02; H04W 4/06; H04W 8/22; H04W 24/00; H04M 1/02; H04M 1/60; H04M 3/00; H04M 3/54; B60W 50/00; B60K 21/00; B60K 28/02; B60R 1/00; B60R 16/02; B60L 1/00; B60Q 1/00; B60Q 9/00
  See application file for complete search history.

(56) References Cited

U.S. PATENT DOCUMENTS

| | | | |
|---|---|---|---|
| 6,014,602 A | 1/2000 | Kithil et al. | |
| 6,256,503 B1 | 7/2001 | Stephens | |
| 6,256,558 B1 | 7/2001 | Sugiura et al. | |
| 6,392,542 B1 | 5/2002 | Stanley | |
| 6,690,940 B1 | 2/2004 | Brown et al. | |
| 6,771,161 B1 | 8/2004 | Doi et al. | |
| 7,180,306 B2 | 2/2007 | Stanley et al. | |
| 7,668,122 B2 * | 2/2010 | Sung | H04B 13/005 370/280 |
| 7,725,089 B2 * | 5/2010 | Lee | H04B 5/0012 340/573.1 |
| 7,856,203 B2 | 12/2010 | Lipovski | |
| 8,457,692 B2 | 6/2013 | Fyke et al. | |
| 8,704,651 B2 | 4/2014 | Nix et al. | |
| 2003/0220725 A1 | 11/2003 | Harter et al. | |
| 2004/0056758 A1 | 3/2004 | Schwartz | |
| 2004/0083031 A1 * | 4/2004 | Okezie | A61B 5/145 701/1 |
| 2004/0198306 A1 | 10/2004 | Singh et al. | |
| 2005/0255874 A1 | 11/2005 | Stewart-Baxter et al. | |
| 2006/0025098 A1 | 2/2006 | Peusens et al. | |
| 2006/0208577 A1 | 9/2006 | Richter et al. | |
| 2007/0001828 A1 | 1/2007 | Martinez | |
| 2007/0200721 A1 | 8/2007 | Stanley et al. | |
| 2007/0285218 A1 | 12/2007 | Fletcher et al. | |
| 2008/0183388 A1 * | 7/2008 | Goodrich | A61B 5/14546 701/300 |
| 2008/0186282 A1 | 8/2008 | Nix et al. | |
| 2008/0228046 A1 | 9/2008 | Futatsuyama et al. | |
| 2009/0215466 A1 | 8/2009 | Ahl et al. | |
| 2009/0233548 A1 | 9/2009 | Andersson et al. | |
| 2009/0295554 A1 | 12/2009 | Hansen | |
| 2010/0009626 A1 | 1/2010 | Farley | |
| 2010/0012417 A1 * | 1/2010 | Walter | B60K 28/063 180/272 |
| 2010/0052849 A1 | 3/2010 | Steegmann et al. | |
| 2010/0057332 A1 | 3/2010 | Katoh et al. | |
| 2010/0069001 A1 | 3/2010 | Arndt et al. | |
| 2010/0238955 A1 | 9/2010 | Sung et al. | |
| 2010/0272076 A1 | 10/2010 | Cavalcanti | |
| 2010/0295695 A1 | 11/2010 | Kedenburg et al. | |
| 2011/0021234 A1 | 1/2011 | Tibbitts et al. | |
| 2011/0117863 A1 | 5/2011 | Camp et al. | |
| 2011/0117903 A1 | 5/2011 | Bradley | |
| 2011/0136509 A1 | 6/2011 | Osann, Jr. | |
| 2011/0153118 A1 | 6/2011 | Lim et al. | |
| 2011/0227856 A1 * | 9/2011 | Corroy | H04B 13/005 345/173 |
| 2011/0294465 A1 | 12/2011 | Inselberg | |
| 2012/0021717 A1 | 1/2012 | Schmidt | |
| 2012/0041633 A1 | 2/2012 | Schunder et al. | |
| 2012/0046020 A1 | 2/2012 | Tomasini | |
| 2012/0055726 A1 * | 3/2012 | Hannon | H04K 3/415 180/272 |
| 2012/0088446 A1 * | 4/2012 | Fyke | H04K 3/415 455/1 |
| 2012/0109451 A1 * | 5/2012 | Tan | G01C 21/3664 701/36 |
| 2012/0119902 A1 | 5/2012 | Patro et al. | |
| 2012/0244883 A1 | 9/2012 | Tibbitts et al. | |
| 2012/0268145 A1 | 10/2012 | Chandra et al. | |
| 2012/0268294 A1 * | 10/2012 | Michaelis | G06F 9/4443 340/905 |
| 2013/0096771 A1 * | 4/2013 | Srenger | B60K 37/06 701/36 |
| 2013/0109305 A1 | 5/2013 | Savoj et al. | |
| 2013/0176100 A1 * | 7/2013 | White | G08C 19/00 340/1.1 |
| 2013/0231046 A1 | 9/2013 | Pope et al. | |
| 2013/0244625 A1 * | 9/2013 | Brakensiek | H04M 1/72577 455/414.1 |
| 2013/0274997 A1 * | 10/2013 | Chien | G06F 17/00 701/36 |
| 2014/0162586 A1 | 6/2014 | Cech | |
| 2015/0253753 A1 | 9/2015 | Bennett et al. | |
| 2016/0196098 A1 * | 7/2016 | Roth | B60K 35/00 715/761 |

FOREIGN PATENT DOCUMENTS

| | | |
|---|---|---|
| JP | 3183209 | 7/2001 |
| JP | 2008-238952 A | 10/2008 |
| KR | 10-2001-0022480 | 3/2001 |
| WO | WO-2012/122385 | 9/2012 |
| WO | WO-2013/103963 | 7/2013 |
| WO | WO 2013/103963 A1 | 7/2013 |
| WO | WO-2014/089446 | 6/2014 |
| WO | WO 2015/134458 A1 | 9/2015 |

OTHER PUBLICATIONS

Written Opinion dated Jun. 29, 2015 issued in PCT/US2015/018436.
Supplementary European Search Report dated Nov. 30, 2017 issued in European Patent Application No. 15 75 8354.3.

* cited by examiner

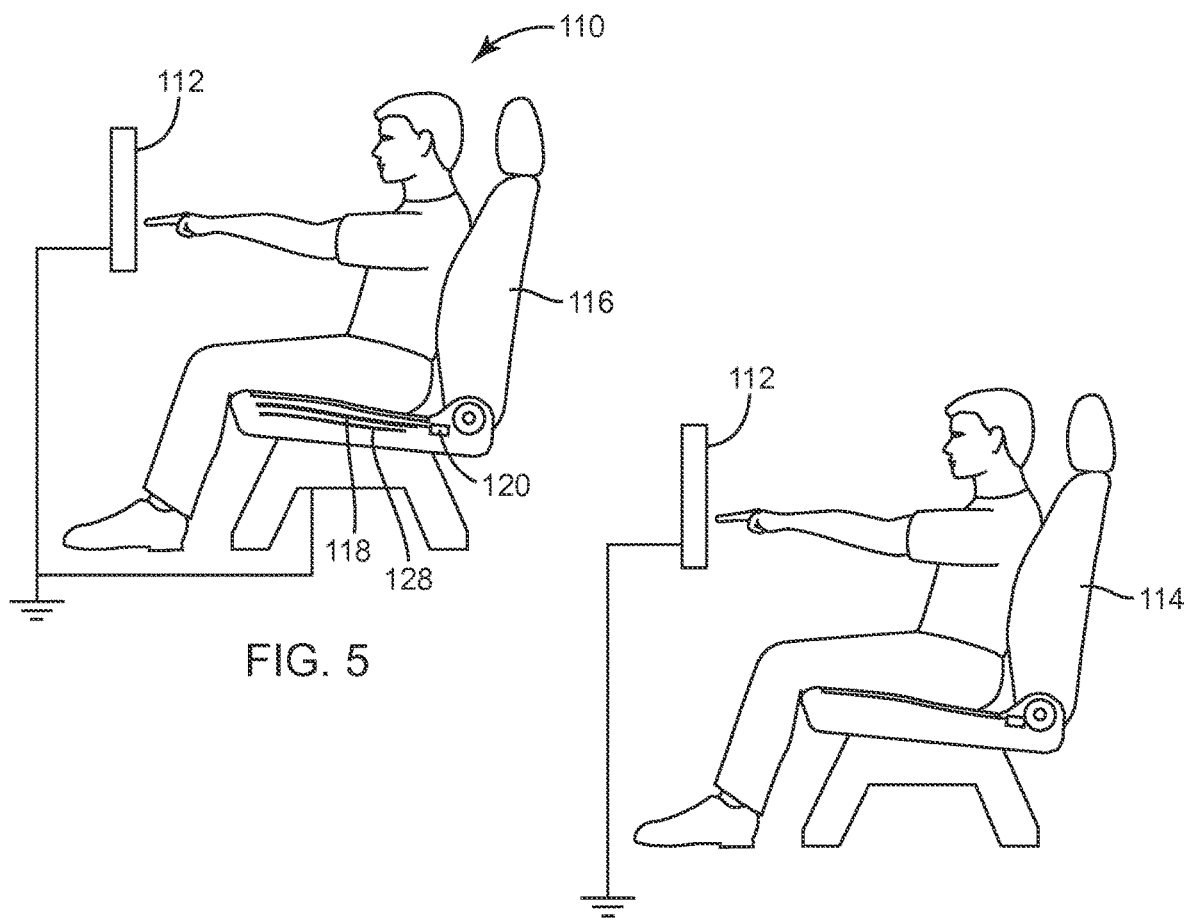
FIG. 5
FIG. 6
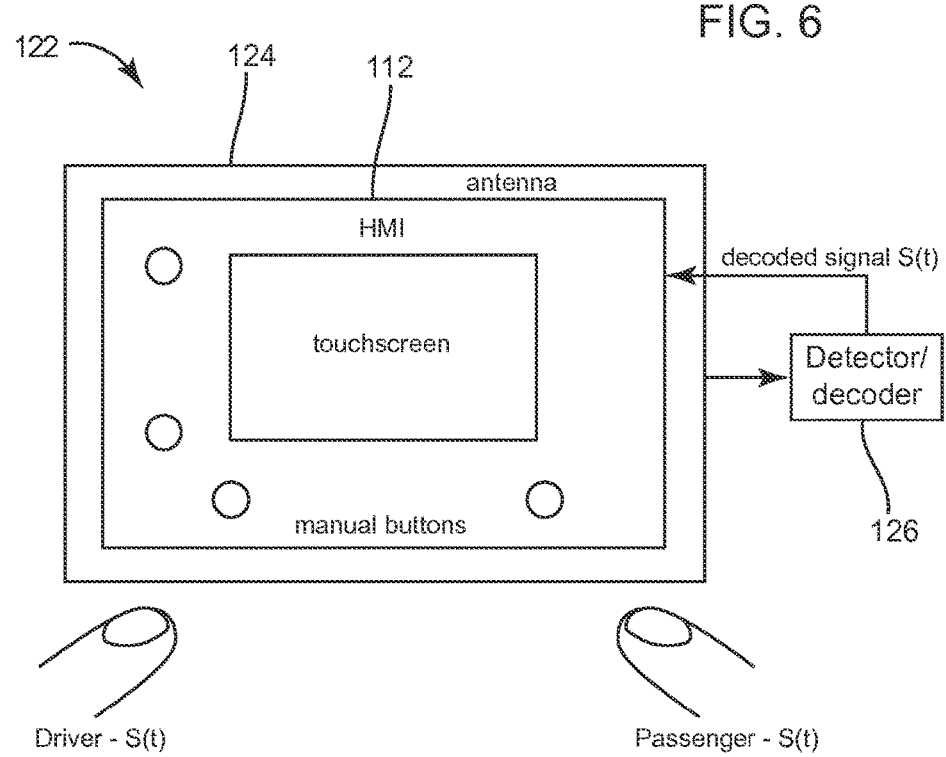
FIG. 7

SYSTEM AND METHOD FOR CONTROLLING A HUMAN MACHINE INTERFACE (HMI) DEVICE

CROSS-REFERENCE TO RELATED APPLICATIONS

The present application claims priority to and the benefit of U.S. Provisional Patent Application No. 61/947,741 filed Mar. 4, 2014. The foregoing provisional application is incorporated by reference herein in its entirety.

DESCRIPTION

The present application relates to a system that includes detecting and discriminating coded information transmitted in electromagnetic fields for in-vehicle occupant classification sensor systems. Such systems are described in previous TKH patent filings, for example: PCT/US2012/028295 (Occupant Sensor System (Method and apparatus for ensuring intended operation of an alcohol measurement driver lock out system), PCT/US2013/020533 (Automated Electronic Device Network Pairing Based on Electric Field Coupling), PCT/US2013/073603 (System and Method for Automated Network Pairing Using Electric Field Coupling). The foregoing applications are incorporated by reference herein. These foregoing applications disclose systems and methods to associate a seating location, an occupant, a vehicle state and in-vehicle or personal electronics through information coded in an electromagnetic field occupant classification sensor.

The detection concepts described herein are based on the communication methods described in the above patent applications, and can also be used to reduce driver distraction in support of National Highway Traffic and Safety Administration (NHTSA) guidelines for in-vehicle electronics.

It is becoming increasingly common for current vehicles to include some type of "infotainment system" (i.e., an electronic system which provides audio, visual, and/or haptic information to a vehicle driver and/or passenger). Infotainment systems typically incorporate mechanical and/or electrical buttons which, when activated, change the control state of an audio, visual, haptic feedback system. For example, human touching of a capacitive touch screen can be used to change the menu displayed on a screen, or to scroll through lists of selection options, or used to select a specific option. However, current infotainment systems do not distinguish between the user who is touching the system. Therefore, a driver may be equally able to control an infotainment system as a passenger.

The detection concepts described herein are intended to work primarily with in-vehicle electronic systems, such as an infotainment system which incorporates various haptic controls. For example, some haptic controls may include mechanical or electric field buttons contained in a front seat infotainment center console (head unit), a heads-up display (HUD), a cluster display, a rear seat roof display, a seat-back mounted display, or any other suitable display or in-vehicle human-machine interface (HMI) system.

The increased use of electronic devices, particularly mobile communications devices, currently allows for continuous communication, entertainment, and the transfer of information from nearly any location. As a result, many individuals carry such electronic devices in direct physical proximity to their bodies throughout the day.

Various systems and methods to electromagnetically couple or "pair" a handheld or portable electronic device with a fixed communication network (e.g., a vehicle communication bus) are known in the art. Further, some systems may automatically detect an electronic device, and enable its "hands-free" application use. Such systems may require a user to perform an initial setup process between the fixed communication network and the electronic device (e.g., a setup process may identify a particular electronic device by using a serial code, mobile equipment identifier (MEID), or similar identifier). Further, each new user, and each additional device may be required to undergo an initial setup process.

Such systems that automatically electromagnetically couple an electronic device may also require that the user has enabled automated pairing between the device and a network. Automated pairing between an electronic device and a network may use an electronic information exchange paradigm, such as Bluetooth or Wifi. Further, a fixed communications network may initiate a pairing process, and detect every electronic device enabled to communicate within the selected communication paradigm (e.g., Bluetooth, Wifi) independent of the location of the user or the device. Therefore, current pairing techniques may not independently identify the physical location of the user or the device.

In some situations, there may be a need to control an electronic device based on the location of the user or the device. For example, certain laws and regulations restrict the use of an electronic device on an airplane. Therefore, in accordance with such laws, a system or method may be used to control the use of an electronic device on an airplane. In addition, a person who is driving a vehicle or operating a machine may be impaired by their concurrent use of an electronic device. Therefore, in order to prevent a vehicular accident, a system or method may be used to control an electronic device based on the actual physical location of either the person or the device. The present application discloses a system and method for controlling an HMI portion of a device (e.g., a vehicle infotainment system) based on a person's location in a vehicle.

Various systems and methods that estimate, or determine the proximate location of a device are known in the art. For example, GPS and/or cellular network triangulation may indicate that an electronic device is in motion, and cooperatively-loaded application software on the electronic device may control handheld use of the device. However, these systems and methods cannot distinguish whether the electronic device is in the possession of a driver or a passenger. Therefore, a passenger of a vehicle (i.e., someone other than the driver), whose use of an electronic device is not impaired from operating a vehicle, may have to manually bypass a system or method used to control the electronic device.

Further, various systems or methods used to control an electronic device may not distinguish between different modes of transportation. For example, while it may be desired to control the use of an electronic device by a driver of a vehicle, the same electronic device may not need to be controlled for use on public transportation (e.g., train, bus, taxi, etc.).

In an alternative system, a wireless transmitter for a fixed communications network, such as a vehicle communication bus, may transmit a signal to an electronic device that includes information relating to a condition of a network. In the case of a vehicle, the information in a signal may include whether the vehicle is in motion or in gear. Cooperatively loaded application software on an electronic device may detect the signal from the fixed communications network.

Depending on the information included in the signal, the application software may control various features of the electronic device. For example, cooperatively loaded application software on the electronic device may use information from a signal to limit the handheld use of the device, or to provide cellular notification to back-end services (e.g., speed alerts).

A system or method for automated network pairing using electric field coupling may require an electronic device to include hardware that can receive or transmit a signal to the fixed communications network. A system or method for automated network pairing using electric field coupling may also require software to interface with the fixed communications network or detect a signal transmitted by the fixed communications network. Such an electronic device that is in proximity to detect a signal transmitted by the network may be controlled by the cooperatively installed software on the device.

A system or method that can detect, electronically couple with, and control an electronic device may not distinguish between a device used by an intended user (i.e., a driver of a vehicle) and an unintended user (i.e., a passenger of a vehicle). Further, an unintended user may be required to manually bypass the system or method to control an electronic device.

DETAILED DESCRIPTION OF THE DRAWINGS

Features, aspects, and advantages of the present disclosure will become apparent from the following description, and the accompanying exemplary embodiments shown in the drawings, which are briefly described below.

FIG. 5 is a view of a passenger seat of a vehicle including a system for controlling a HMI device.

FIG. 6 is a view of a driver seat of a vehicle including a system for controlling a HMI device.

FIG. 7 is a schematic view of a HMI device including a touch screen and a detector/decoder.

DETAILED DESCRIPTION

Various embodiments of the present disclosure will be described below with reference to the drawings. It is to be understood that both the foregoing general description and the following detailed description are exemplary and explanatory only, and are not restrictive of the disclosure.

A system proposed herein may dependently associate the physical presence of an occupant (e.g., vehicle seating location) with a location of the electronic device (e.g., held in hand, in pocket, etc.). Such a system may allow one-way or two-way communication between a fixed network and the electronic device, and through an occupant, in order to dependently establish control/communication parameters of the device, as well as software application activation, based on a specified position of the device.

Figure 1:
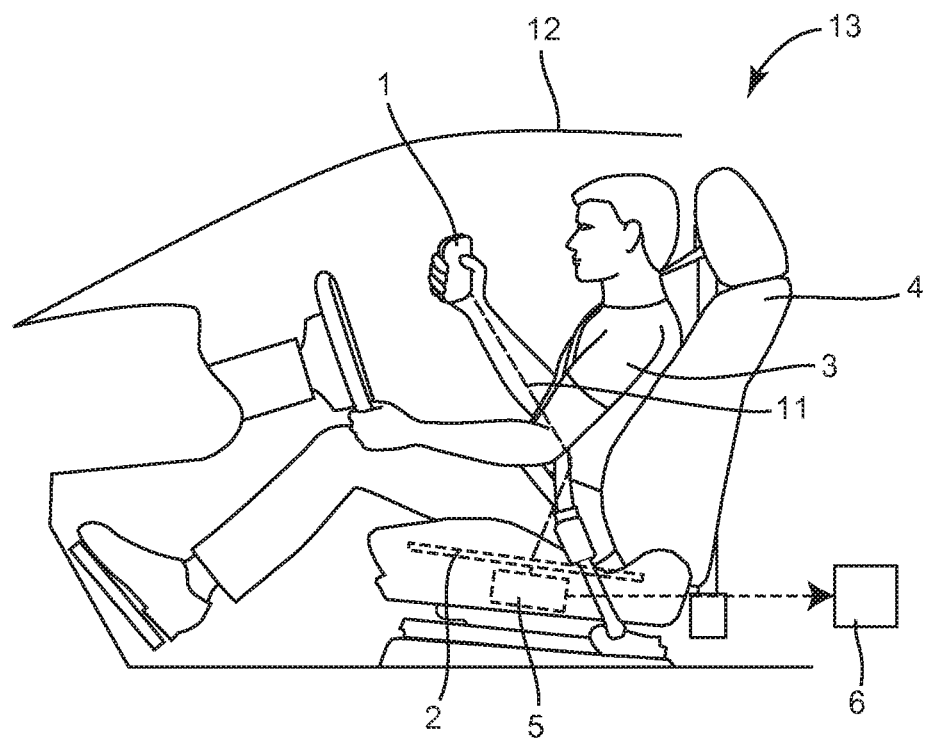
FIG. 1 is a schematic side view of a vehicle interior showing a system for facilitating the communication between an electronic device and the vehicle.

As shown in FIG. 1, an electric field coupling network 13 may be used to establish a communications connection or electronically couple or pair a fixed communications network, such as a vehicle communications bus 6, with an electronic device 1. A driver 3 of a vehicle 12 may be seated on a vehicle seat 4, and an electronic device 1 may be coupled (i.e., electric field coupling) to the driver (e.g., an electronic device 1 may be held in the hand of the driver 3, in a pocket of the driver's clothes, or in any other location that is sufficiently proximate to the driver). A system 13 used to electronically couple an electronic device to a network may include a capacitive sensor pad 2 provided in a vehicle seat 4 within a vehicle 12. While sensor pad 2 may be provided in a driver's seat 4 of a vehicle, this disclosure is not intended to limit the possible locations in which a sensor pad may be located. Therefore, a sensor pad may be located anywhere in a vehicle interior (i.e. in a passenger seat, the vehicle floor, an arm rest, the steering wheel, a cup holder, etc.).

Figure 2:
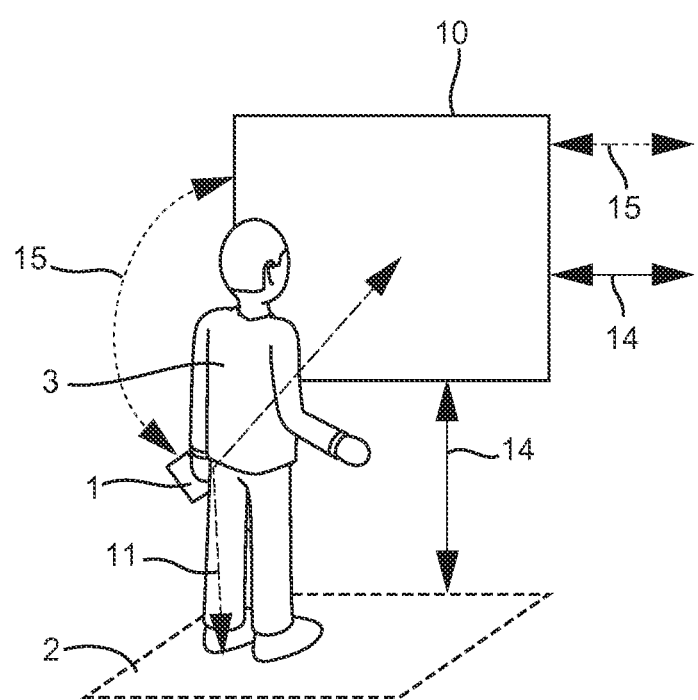
FIG. 2 is a schematic view of a system for facilitating the communication between an electronic device and a human-machine interface (HMI) via a standing person.
Figure 3:
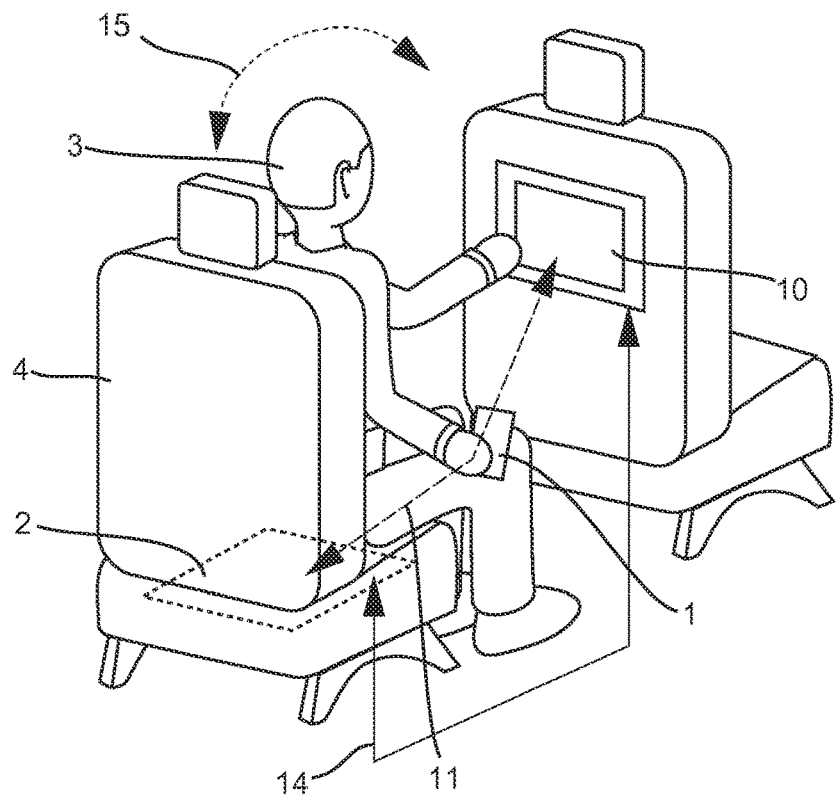
FIG. 3 is a schematic view of a system for facilitating the communication between an electronic device and a human-machine interface (HMI), wherein the system is implemented in a front and rear seat configuration.

As shown in FIGS. 1-3, a sensing electrode, which may be configured as part of a sensor pad 2, may be used to detect the presence or occupancy of a person or object that is positioned within a prescribed location. Further, sensor pad 2 may be used to detect various characteristics of an object, such as its position on a seat. Sensor pad 2 may also be used to discriminate or categorize the object (e.g., person, baby seat, shopping bag, etc.), and to detect other characteristics of the object (e.g., stature, position, loading, etc.). The sensor pad 2 may be provided as a component of a system, such as an occupant detection or classification system. Such a system may include a controller which may be packaged separately from or with a signal generator, sensing circuit and other components typically used for occupant classification and detection. For example, the electrode and sensor pad may be employed with an occupant detection and classification system similar to the systems disclosed in U.S. Pat. No. 6,392,542 and U.S. Published Patent Application No. 2007/0200721 (both incorporated by reference herein).

A system 13 may also be configured to transmit a signal 11 to a conductor in the sensor pad 2 and through a person positioned within a prescribed location. When the system is used for occupant sensing a sensing circuit may be provided for signal generation and occupant sensing. Alternatively, a separate control unit including a signal generator may be provided. The signal generator provides a signal, e.g., a sinusoidal signal, to an electrode in the seat or floor or other location proximate to the person. For instance, the transmitted signal 11 may have a particular frequency and power, and the frequency of the transmitted signal 11 may be configured to allow it to be redistributed through the person via electric field coupling when the person is positioned within a prescribed location. Such a signal may be configured so that it is transmitted through the air surrounding a person positioned within a prescribed location.

As shown in FIG. 1, sensor pad 2 may transmit a signal 11, which may be configured to be redistributed via electric field coupling through driver 3 that is sitting on seat 4. As shown in FIG. 2, a sensor pad may be disposed within a floor, be configured to transmit a signal 11 to a person 3, who is standing over sensor pad 2. The transmitted signal 11 may be configured to be redistributed through person 3 via electric field coupling.

Sensor pad 2 may also be electronically coupled to support electronics 5 which may be configured to measure the amount of electric field coupling between sensor pad 2 and objects proximate the sensor pad. As shown in FIG. 1, the support electronics 5 may, in turn, be electronically coupled to a vehicle communication bus 6. The support electronics may include a signal generator, at least one integrated circuit, discrete electronic components, printed circuit board, or microprocessor, for example. As mentioned above, the system may be similar to the systems disclosed in U.S. Pat. No. 6,392,542 and U.S. Published Patent Application No. 2007/0200721 (both incorporated by reference herein).

As shown in FIG. 1, an electronic device 1 may be configured to detect the transmitted signal 11 when the signal 11 is transmitted through a person, and the electronic device 1 is coupled to the person. An electronic device 1 may be configured to detect the transmitted signal 11 when electronic device 1 is positioned within a prescribed location, such as the driver's seat of a vehicle. The detection of the signal may be conducted utilizing a tuning circuit located in the electronic device. Exemplary tuning circuits are disclosed, for example, in U.S. Published Patent Application No. 2011/0117863 (incorporated by reference herein).

Further, when an electronic device detects the transmitted signal 11, a response of the device may be to electronically couple, or interface, with a fixed communications network, such as a vehicle communication bus 6. An electronic device 1 may also include hardware and/or software to facilitate or control the coupling of the electronic device to a fixed communications network.

The transmitted signal 11 may be configured to carry particular information used to distinguish it from other signals, this particular information may be digital or analog information. Further, the power of the transmitted signal 11 may be configured to be sufficiently strong to be transmitted through a person who is coupled to an electric field generated around the signal carrying sensing electrode, but not sufficient to be transmitted from the person's body. Therefore, an electronic device may be configured to detect the signal 11 only when the person is concurrently coupled to the electronic device and the electric field. When the electronic device detects the signal 11, it may distinguish the signal based on the information contained in the signal.

Upon detection of the signal 11, the electronic device 1 may initiate a pairing process with a fixed communications network (e.g., including a HMI device in a vehicle) in which the electronic device 1 automatically connects to the network. A pairing process may be accomplished in a variety of ways. For example, in order to ensure the security of the connection, the electronic device 1 may initiate the pairing process by transmitting a wireless signal to the network. In order for the network to distinguish the signal transmitted from the electronic device 1, and to ensure the security of the connection between the device and the network, the signal may be configured to have a particular frequency or to carry particular information. The electronic device 1 and the network may perform a variety of processes in order to maintain security there between. For example, the device and network may be time-synced and the network may use an algorithm to determine a random frequency pattern that is shared with the electronic device 1. While some examples have been described in which an electronic device may automatically connect with a fixed network, it should be understood that the electronic device 1 disclosed herein may perform a variety of methods in order to connect to a fixed communications network.

The fixed communication network may also initiate a pairing process in order to connect to the electronic device 1. For example, the network may continuously transmit a wireless signal to a surrounding area. Alternatively, the network may be triggered to transmit a wireless signal to a surrounding area when a person is detected within a prescribed location (e.g., a prescribed location may be proximate a sensing electrode that transmits a capacitive signal). The wireless signal transmitted from the network may use an authorization or identification process to establish a secure connection with an electronic device. Such an identification process may require the electronic device 1 to transmit a signal having particular information to the network. Concurrently, the electronic device 1 may be coupled via a signal that is transmitted from a prescribed location (e.g., an EMF electrode mounted in a seat), and the signal may contain particular information. When the electronic device detects the transmitted signal, the device may use the particular information carried by the signal (e.g., a sinusoidal signal) to satisfy the network's authorization or identification process. In order to maintain a secure connection, the electronic device 1 and the network may be time-synced and the network may use an algorithm to determine a random frequency pattern that is shared with the electronic device 1. While some examples have been described in which a network may automatically connect with the electronic device 1, it should be understood that the network and the electronic device 1 disclosed herein may perform a variety of methods in order to automatically establish a connection.

Referring now to FIG. 2, an alternative exemplary embodiment is shown for a system that may use electric field coupling to automatically connect to a network. The system may include a sensor pad 2 containing an electrode and being positioned proximate to a standing person 3 (e.g. the sensor pad may be embedded in a floor). A sensor pad may be positioned so that a person 3 standing thereon is within proximity of a human machine interface (HMI) device (e.g., audio, video, tactile, etc.). The sensor pad shown in FIG. 2 may transmit a signal 11 via the electrode at particular frequency in order to enable electric field coupling. In other words, the transmitted signal 11 may be configured to be redistributed through a person 3 via electric field coupling. When person 3 is positioned within sufficient proximity of a sensor pad 2, an electronic device 1 coupled to person 3 may be electronically coupled to a fixed communications network, such as a HMI device, and any network that is simultaneously electronically coupled to the fixed communications network. Information may be exchanged among each of these networks when electronic device 1 is electronically coupled to a fixed communications network or other network.

Referring now to FIG. 3, an alternative embodiment is shown for a system that may be implemented in a particular seating configuration in which a seat is positioned behind another seat. Such a seating configuration may be used, for example, within a bus, train, or airplane. A capacitive sensor pad 2 may be mounted within a seat 4 that is configured according to the arrangement shown in FIG. 3. Further, a fixed communications network, such as a human machine interface (HMI) device 10 (e.g., audio, video, tactile, etc.) shown in FIG. 3, may be positioned on a rear facing surface of an adjacent seat, compartment wall, or bulkhead. Sensor pad 2 may be configured to transmit a signal 11 through a person 3 who is seated on seat 4. An electronic device 1 coupled to person 3 may be configured to detect the transmitted signal 11, and electronically couple to HMI device 10. Therefore, when person 3 is occupied within a particular location proximate a HMI device, a communication state may be established between a device 1, the HMI device, and any wired network 14 or wireless network 15 that is electronically coupled to the HMI device. Such a system may be used to facilitate the exchange of information between sensor pad 2, electronic device 1, and HMI device 10.

Figure 4:
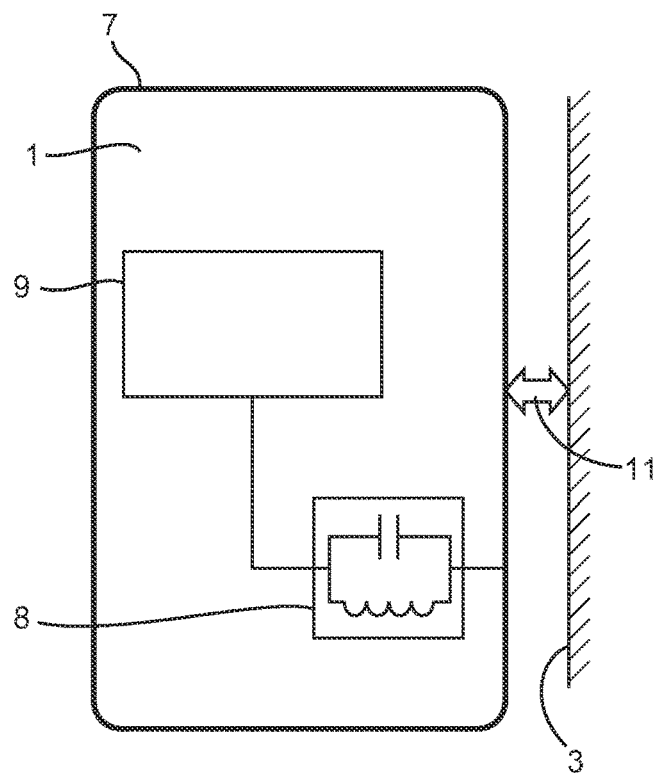
FIG. 4 is a schematic view of an electronic device for use with the system shown in the embodiments of FIGS. 1-3.

As shown in FIG. 4, an electronic device 1 may include a communication module 9 and a tuned circuit 8. Communication module 9 may include several sub-modules configured to detect, filter, modulate, or demodulate signals, including wireless digital or analog signals. Communication module 9 may also include a digital signal processor, among other components. A tuned circuit 8 may be coupled to a component of an electronic device 1, such as an outer casing 7 or a tuned antenna. The tuned circuit 8 may be configured to detect a signal 11 having a capacitive coupled frequency (e.g., approximately <=200 Khz) when the device is in contact with or proximate to a person's body (e.g., finger, hand, skin in proximity to a pocket, waistbelt, etc.). While a signal 11 having a frequency of approximately <=200 Khz is suggested, this is not intended to limit the scope of this disclosure or the range of possible frequencies that may be used to transmit through a person or to an electronic device via electric field coupling.

A method to electronically couple an electronic device to a fixed communication network that may include a transmitter to transmit an electronic signal to an electrode and through to a person occupying a prescribed location and coupled to the electronic device. Based upon detection of the signal by the electronic device, the electronic device may electronically couple the electronic device to the network. In such a method, the signal may be configured to be redistributed through a person via electronic field coupling. Further, the electronic device may be coupled to the person in order to detect the signal.

A system or method may use electric field coupling to electronically couple or "pair" an electronic device 1 with a network may generate a signal having a capacitive coupled frequency. For example, an electrode in a capacitive sensing subsystem may transmit a signal having a capacitive coupled frequency. The signal may be configured to be transmitted across a person who is sufficiently proximate to an electrode or sensing pad generating the signal. A tuned circuit 8 of an electronic device 1 that is sufficiently proximate to the person's body may detect the signal having a capacitive coupled frequency. An electronic device 1 may be configured to detect a signal having a capacitive coupled frequency, and either a communication module 9 or the electronic device 1 may be configured to automatically pair with a network that is electronically coupled to the capacitive sensing subsystem.

A sensor pad and supporting electronics may cooperate with hardware and software added to an electronic device to detect the location and possession of the device. When an electronic device is detected in a particular location, this information may be used, for example, to disable the use of an electronic device in possession of the driver while the vehicle is operational. In a similar fashion, a system may be configured to detect and control an electronic device 1 that is placed on an unoccupied seat (e.g., when a driver places a cell phone on an empty passenger seat).

A sensor pad may be incorporated into various other vehicle compartments. For example, a sensor pad may be embedded in a cup-holder, a phone receptacle or another location where an electronic device may be placed. A sensor pad 2 may be located in a passenger seat, and configured to transmit a signal 11 provided to the electrode type sensor located in the pad. The signal 11 has a particular frequency. An electronic device 1 may detect the transmitted signal 11 via electronic field coupling when the device is placed on the seat, or when the device is otherwise within sufficient proximity of the transmitted signal 11. In response to the detection of the transmitted signal by the electronic device 1, various hardware or software of the electronic device 1 may automatically control the use of the electronic device while the vehicle is in motion. Also, hardware or software of electronic device 1 may electronically couple or "pair" the device with a vehicle communication bus 6 and enable hands-free technology.

A system to electronically couple an electronic device and a fixed communications network may be utilized in a wide variety of locations, including personal and public transportation vehicles, homes, schools, business locations, and other venues. Advantageously, several personalized and selectable communications modes, which are based on the physical location of an electronic device, may exist for particular systems used to electronically couple an electronic device and a fixed communications network. The operational modes of the system may include personalized, selectable communication modes based on physical locations (e.g., a car driver mode, a car passenger mode, a bus mode, a plane mode, a train mode, a theater mode, etc.). The operational characteristics of the device and the coupled communications network may be automatically adjusted after the coupling is established (e.g., cell phone ringer disabled in movie theater; hands-free enabled in car driver seat; music/video playback enabled in bus, infotainment system enabled in a plane seat back, etc.).

Advantageously, a system 13 may allow a single fixed communications network connected to a HMI (e.g., a touch sensitive display) to be customizable by a specific human touch by allowing the user interface to function differently for different occupants of a vehicle, for example. In other words, a HMI may distinguish between a person who is positioned at a particular location, and a person positioned in an alternative location. For example, an HMI in the form of a dashboard mounted touch screen in a vehicle may be configured to function in a first manner with respect to a driver of the vehicle, and in a second manner for a passenger of the vehicle. The functionality of the HMI may be more limited for the driver in order to reduce driver distraction, for example.

A system 13 may be configured so that the electric field characteristics of the sensor pad change from a first configuration (i.e., a normal operating configuration) to a second configuration when a vehicle event occurs. A signal having a second configuration may enable an alternative means of network communications between an electronic device 1 and a fixed communications network. For example, if a vehicle experiences an event, such as a vehicle collision, or a roll-over, sensor pad 2 may transmit a signal having a second configuration which all electronic devices within the vehicle compartment may be configured to detect. When an electronic device detects a signal having a second configuration, the device may be configured to automatically initiate an emergency phone call.

FIGS. 5-7 depict several systems and methods for controlling an in-vehicle electronic system that includes an HMI device, such as a touch screen. The HMI device includes a processor that controls the operation of the HMI device. The processor executes routines or programs based on various inputs. Referring to FIG. 5, a control system 110 may be used for controlling an in-vehicle electronic system that includes various components such as a HMI device 112. The system includes an electromagnetic field (EMF) sensor or electrode 118 located in a vehicle seat 116. The system may alternatively include a shielding layer 128 for blocking interference with the sensor 118, when the sensor is being used for occupant classification or detection. The sensor 118 is connected to a common ground with the HMI device 112. As shown in FIG. 6, the vehicle may include another seat which does not include a commonly grounded sensor.

The system further includes a controller 120 that includes a signal generator or transmitter. The HMI device 112 may be in the form of a front seat infotainment center console (head unit), a heads-up display (HUD), a cluster display, a rear seat roof display, a seat-back mounted display, or any other suitable display or electronic system. The HMI device 112 may include specific portions and/or specific functionality controlled by the HMI processor. Certain functionality requires a closed circuit between the HMI device 112, the EMF sensor 118, the transmitter 120, and ground. Thus, the HMI device 112 is configured to operate in two modes of operation. In a first operational mode, the HMI device 112 operates in a closed circuit due to the proximity between an occupant (e.g., the passenger) seated in a seat containing the sensor 118. In a second operational mode, the HMI device 112 does not detect a grounded sensor via the occupant (e.g., the driver) because the occupant is not seated in a seat containing a transmitting sensor.

The EMF sensor 118 and/or the controller and transmitter 120 may be positioned in a suitable location sufficiently proximate to the seating surface of the first seat 116, and sufficiently far from the second seat 114. For example, the EMF sensor 118 and/or the transmitter 120 may be positioned in any suitable location which would allow only a person sitting in the first seat 116 to complete a grounded circuit between the HMI device 112, and either the EMF sensor 118, or the controller and transmitter 120.

The HMI control system 110 is configured such that the location of an EMF sensor and/or a transmitter would not allow a closed grounded circuit between a person in the second seat 114 and the HMI device 112. Thus, the system is able to differentiate between the passenger and the driver interacting with the HMI device 112. For example, the system 110 is configured to detect a grounded signal from an EMF sensor or a transmitter when a person sitting in passenger seat 116, for example, touches the HMI device 112. As a result, the system may be configured so that a person sitting in the passenger seat 116 may be able to control portions of the HMI device 112 that a person sitting in the driver seat 114 cannot control. Thus, for example when the grounded signal is detected the system operates in a first mode of operation.

In an alternative configuration, both the passenger and driver seat systems may each include a separate controller and signal generator. Alternatively, the passenger and driver seat systems may share a common controller and signal generator. The signal generator may operate on a cycle so that an appropriate signal is provided on an alternating basis to the sensors located in each of the driver and passenger seats. The EMF sensor 118, the transmitter 120, and the first seat 116 may be configured so that when a person is seated on the first seat 116, a signal having a particular frequency and/or field level may be transmitted from the transmitter to the sensor electrode 118 located in the vehicle seat. The signal is further transmitted (e.g., via electric field coupling) from the sensor 118 through the occupant, and to the HMI device 112. The frequency of an encoded signal may be configured so a human body can redistribute the signal easily. The signal being transmitted through the occupant seated on the second seat 114 would have a particular frequency and/or field level so that the HMI device would be able to distinguish between a signal being carried by the driver and a signal being carried by the passenger.

Referring to FIG. 7, a detection/decoding system may be provided separately from the HMI device 112. For example, a detection/decoding system 122 may include a proximity antenna 124 and a detection circuit, such as a tuned tank circuit 126 with decoding logic. The proximity antenna 124 is coupled to the tuned circuit 126. The HMI device 112 may include a general purpose input/output (GPIO) port, and the proximity antenna 124 and the tuned circuit 126 may be coupled to the HMI device 112 via a GPIO port. Thus, the system may be easily incorporated into existing infotainment system designs.

As shown in FIG. 7, a separate detection and decoding system may be provided to supplement the HMI device. For example, the detection and decoding system may include a proximity antenna or electrode 124 (i.e., the detection device) may be provided external to the HMI device 112. A decoding device, for example a tuned tank circuit with decoding logic, may receive the signal from the antenna and provide further input to the HMI device. The detection and decoding system may be connected to the HMI device via a general purpose input/output port, for example.

The antenna 124 may be configured as part of a trim or gasket piece which surrounds the HMI device 112. For example, the proximity antenna 124 may be embedded within the trim of the HMI device 112, or located in close proximity to the antenna 124 (e.g., within a dash of a vehicle). Further, the related decoding device may be configured to detect a coded signal transmitted through a human hand that comes within a certain detecting distance. Based on the coded information within the signal, the detection and decoding system may be able to distinguish between whether the hand belongs to a driver or a passenger. Further, the decoding system may decode the signal to create a simple input single indicative of which vehicle occupant is attempting to interact with the HMI device 112. The input signal is provided to the HMI device controller, which is configured to control the operation of the device. The information in the input signal may determine which features of the HMI that may be utilized by the vehicle occupant. For example, if the input signal corresponds to the driver, then the HMI device 112 operates in a first mode and the controlled features may be limited to mechanical switches (e.g., mechanical buttons, and not the touchscreen). On the other hand, if the input signal corresponds to a passenger, then the HMI device 112 operates in a second mode and the passenger may be able to control every feature of the HMI device 112, including the touchscreen.

As shown in FIG. 7 and described above an external detection and decoding system may be configured such that a HMI detects and discriminates coded information which is transmitted through a person. An antenna and/or a circuit detection path may alternatively be provided within a HMI, such as a capacitive touch screen circuit within the HMI. Such a system may be configured to decode a signal in order to determine whether a hand touching the HMI belongs to a driver or a passenger. If a detection/decoding system detects the hand of a driver, a first mode of operation is initiated and the functions of an electronic system (e.g., an infotainment system including a HMI device, etc.) may be limited to mechanical switches. Conversely, if a detection/decoding system detects the hand of a passenger, a second mode of operation is initiated and the functions of an electronic system may not be so limited.

An EMF sensor and a transmitter may be positioned within both the driver seat and the passenger seat. The signals transmitted from the driver seat and the passenger seat may have different frequencies and/or include different coded information. Further, the HMI may be configured to detect and distinguish between the different signals. Thus, HMI content can be optimized to reduce the chances of the driver becoming distracted (e.g., visual or haptic distraction) while allowing passengers complete access to a wider range of infotainment options.

It should be understood, according to any of the embodiments disclosed herein, that HMI content may be controlled based on a particular seating location and vehicle state. For example, when the vehicle transmission is in "park", a detection/decoding system may be configured such that the driver has full access to an electronic system such as a HMI device of an infotainment system. In contrast, when the vehicle transmission is in a gear, e.g., "drive" for an automatic transmission, the detection/decoding system may limit the access a driver has to control an infotainment system. The vehicle communication bus may be configured to receive a signal from a vehicle sensor and may transmit a signal to the HMI device that includes information relating to the condition of the vehicle (e.g., "park", "drive", speed, engagement of brake, etc.). As described above, the HMI device is configured to change operational mode based on the condition of the vehicle and the location of the person interacting with the HMI device.

Further, it should be understood that in-vehicle infotainment controls (e.g., an HMI device such as described above) may be accessible through various electronic devices (e.g. cell phones connected or paired to the infotainment system through Bluetooth, NFC, Wifi etc.). The pairing of devices using the transmitted signal is described above. It should be understood that an electronic system, such as an infotainment system, may be configured in other ways in order to internally detect a coded signal transmitted from a person, such as a driver or passenger of a vehicle. U.S. Patent Publication NO. 2012/0041633 (incorporated by reference herein) discloses controlling a vehicle infotainment system using an electronic device. The system disclosed in the aforementioned published application may be improved using the system disclosed herein.

When the HMI device (e.g., infotainment system control panel) has an established communications connection (e.g., via Bluetooth or Wifi) with an electronic device (e.g., a mobile phone) the HMI may operate in different modes depending on whether the electronic device is being operated or contacted by a driver or a passenger of the vehicle. For example, if the driver of the vehicle is attempting to operate an electronic device (e.g., a mobile phone), the electronic device detects the signal being transmitted from a sensor mounted proximate to the driver (e.g., in the vehicle seat or steering wheel) through the driver. Upon receipt of the detected signal, the electronic device sends a notification signal via the established communications connection to the HMI device. The notification signal provides an indication to the HMI device and its associated controller that the driver is in contact (and likely attempting to operate) the mobile phone. In response to receipt of the notification signal, the controller directs the HMI device to provide a prompt or question for the driver in order to minimize driver distraction from the road. For example, the HMI device may display and/or broadcast a prompt such as "Would you like to make a telephone call?" The HMI device would then operate in a mode where it functions in response to audible commands made by the driver. When the driver is in contact with the electronic device, the HMI device operates in a restricted mode of operation in which, for example, the HMI device will not accept instructional input from an electronic device that is in contact with the driver or an electronic device that is in receipt of a signal that is carried by the driver.

In an alternative embodiment, as described above, a sensor/conductor could be mounted in the vehicle in a position that is adjacent to a storage location for an electronic device (e.g., mobile phone). The storage location may be a compartment in the center console or instrument panel, or a horizontal non-slip surface on the instrument panel or center console, for example. When the occupant of the vehicle places the electronic device in the storage location, the electronic device receives the signal being transmitted by the sensor. Upon receipt of the transmitted signal, the electronic device establishes a communications connection with a HMI device (e.g., the infotainment system control panel) and various user prompts are broadcast or displayed. Thus, the system is configured so that the occupant is prompted to control the HMI device using a "hands off" mode once the electronic device is mounted in the vehicle adjacent the transmitting conductor. The system can be configured so that the HMI device prompts a driver to provide oral commands rather than attempt to control the HMI device via a mobile phone or direct contact. The HMI device may be configured to only accept tactile commands (e.g., via touch screen, push buttons, dials, etc.) from a passenger carrying an appropriate signal being transmitted through the passenger from an electrode positioned proximate to the passenger.

Exceptions may exist for how a detection/decoding system is used to control an electronic system. Special circumstances (i.e., a vehicle accident or rollover) may override or prevent various features that would otherwise be active. For example, a coded signal used to identify a driver may normally disable touchscreen features of a HMI; however, an exception may be made for emergency or 911 phone calls, or during the event of a vehicle accident or rollover.

Although specific shapes and locations of each element have been set forth in the drawings, each element may be of any other shape or location that facilitates the function to be performed by that element.

For purposes of this disclosure, the term "coupled" means the joining of two components (electrical, mechanical, or magnetic) directly or indirectly to one another. Such joining may be stationary in nature or movable in nature. Such joining may be achieved with the two components (electrical or mechanical) and any additional intermediate members being integrally defined as a single unitary body with one another or with the two components or the two components and any additional member being attached to one another. Such joining may be permanent in nature or alternatively may be removable or releasable in nature.

The present disclosure has been described with reference to example embodiments, however persons skilled in the art will recognize that changes may be made in form and detail without departing from the spirit and scope of the disclosed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the exemplary embodiments is manifestly intended to be as broad as possible. For example, unless specifically otherwise noted, the exemplary embodiments reciting a single particular element also encompass a plurality of such particular elements.

Exemplary embodiments may include program products comprising computer or machine-readable media for carrying or having machine-executable instructions or data structures stored thereon. For example, the sensing electrode may be computer driven. Exemplary embodiments illustrated in the methods of the figures may be controlled by program products comprising computer or machine-readable media for carrying or having machine-executable instructions or data structures stored thereon. Such computer or machine-readable media can be any available media which can be accessed by a general purpose or special purpose computer or other machine with a processor. By way of example, such computer or machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer or machine-readable media. Computer or machine-executable instructions comprise, for example, instructions and data which cause a general purpose computer, special purpose computer, or special purpose processing machines to perform a certain function or group of functions. Software implementations of the present disclosure could be accomplished with standard programming techniques with rule based logic and other logic to accomplish the various connection steps, processing steps, comparison steps and decision steps.

It is also important to note that the construction and arrangement of the elements of the system as shown in the preferred and other exemplary embodiments is illustrative only. Although only a certain number of embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the assemblies may be reversed or otherwise varied, the length or width of the structures and/or members or connectors or other elements of the system may be varied, the nature or number of adjustment or attachment positions provided between the elements may be varied. It should be noted that the elements and/or assemblies of the system may be constructed from any of a wide variety of materials that provide sufficient strength or durability. Accordingly, all such modifications are intended to be included within the scope of the present disclosure. The order or sequence of any process or method steps may be varied or re-sequenced. Other substitutions, modifications, changes and omissions may be made in the design, operating conditions and arrangement of the preferred and other exemplary embodiments without departing from the spirit of the present subject matter.

What is claimed is:

1. A system or controlling the operation of a human machine interface (HMI) device located in a vehicle, wherein the system comprises:

a first electrode positioned n the vehicle;
a portable electronic device configured to be used for communication by an occupant of the seat; and
a signal generating device configured to provide a first signal to the first electrode,
wherein the electronic device is configured to detect the first signal being transmitted by the electrode through the driver and in response to detecting the first signal provide a notification signal to the HMI device;
the HMI device and the electronic device are configured to establish a two way communications connection after the electronic device has detected the first signal;
the HMI device is configured to operate in a first mode when the driver contacts the electronic device, and
upon receipt of the notification signal the HMI device is configured to display a message to the driver in order to reduce driver distraction from a road, wherein
the system further comprises a second electrode positioned proximate to a passenger seat in the vehicle,
the signal generating device is configured to provide a second signal to the second electrode; and
the HMI device is configured to receive tactile commands only from an occupant carrying the second signal to the HMI device.

2. The system of claim 1, wherein the HMI device will not respond to tactile commands of the driver.

3. A System for controlling the operation of a human machine interface (HMI) device located in a vehicle, wherein the system comprises:

a first electrode positioned in the vehicle;
a portable electronic device configured to be used for communication by an occupant of the vehicle; and
a signal generating device configured to provide a first signal to the first electrode, wherein
the electronic device is configured to detect the first signal being transmitted by the electrode and in response to detecting the first signal establish a two way communications connection with the HMI device;
the HMI device includes a display, and
the HMI device is configured so that upon receipt of a communication indicating that the electronic device is receiving the first signal,
the HMI device displays a message requesting for the occupant of the vehicle to provide a voice command in order to reduce driver distraction from a road,
wherein the first electrode is located proximate to a storage location for the electronic device so that when the electronic device is located in the storage location the first signal is detected by the electronic device, wherein
the first electrode is positioned proximate to a driver seat in the vehicle;
the electronic device receives the first signal via an occupant of the driver seat;
the system further comprises a second electrode positioned proximate to a passenger seat in the vehicle, and
the signal generating device is configured to provide a second signal to the second electrode,
wherein the HMI device is configured to receive tactile commands only from an occupant carrying the second signal to the HMI device.

4. A system for controlling the operation of a human machine interface (HMI) device located in a vehicle, wherein the system comprises:

a first electrode positioned proximate to a driver seat in the vehicle;

a portable electronic device configured to be used for communication by an occupant of the seat; and a signal generating device configured to provide a first signal to the first electrode, wherein the electronic device is configured to detect the first signal being transmitted by the electrode and in response to detecting the first signal automatically establish a two way communications connection with the HMI device, and the HMI device is configured to operate in a restricted mode after receiving a notification signal from the electronic device indication the first signal is being carried from the first electrode to the electronic device via the driver in order to reduce driver distraction from a road, a second electrode positioned proximate to a passenger seat in the vehicle, wherein the signal generating device is configured to provide a second signal to the second electrode, wherein the HMI device is configured to operate so that in the restricted mode the HMI device will accept tactile input only from an occupant carrying the second signal from the second electrode to the HMI device.

\* \* \* \* \*